United States Patent
Vance, Jr.

(10) Patent No.: US 9,017,789 B2
(45) Date of Patent: Apr. 28, 2015

(54) INSULATION ASSEMBLIES FOR ENGINE HOUSINGS AND ASSOCIATED METHODS OF USE AND MANUFACTURE

(75) Inventor: Wilson Riley Vance, Jr., Shoreline, WA (US)

(73) Assignee: AmSafe Bridport Limited, Bridport (GB)

( * ) Notice: Subject to any disclaimer, the term of this patent is extended or adjusted under 35 U.S.C. 154(b) by 0 days.

(21) Appl. No.: 13/271,760

(22) Filed: Oct. 12, 2011

(65) Prior Publication Data

US 2014/0099470 A1 Apr. 10, 2014

Related U.S. Application Data

(60) Provisional application No. 61/392,136, filed on Oct. 12, 2010.

(51) Int. Cl.
*B64C 1/40* (2006.01)
*B64D 29/06* (2006.01)
*A44B 17/00* (2006.01)
*A44B 18/00* (2006.01)
*B64C 27/04* (2006.01)

(52) U.S. Cl.
CPC ............... *B64C 1/403* (2013.01); *A44B 17/00* (2013.01); *A44B 18/00* (2013.01); *B64C 27/04* (2013.01); *B64D 29/06* (2013.01)

(58) Field of Classification Search
CPC ............ B64C 1/00; B64C 1/40; B64C 1/403; B64C 1/406
See application file for complete search history.

(56) References Cited

U.S. PATENT DOCUMENTS

| | | | | |
|---|---|---|---|---|
| 4,522,673 | A * | 6/1985 | Fell et al. | 156/307.3 |
| 4,671,979 | A * | 6/1987 | Adiletta | 428/74 |
| 5,472,760 | A * | 12/1995 | Norvell | 428/71 |
| 5,594,216 | A * | 1/1997 | Yasukawa et al. | 181/213 |
| 6,358,591 | B1 * | 3/2002 | Smith | 428/74 |
| 7,059,565 | B2 * | 6/2006 | Scown et al. | 244/117 R |
| 7,083,147 | B2 | 8/2006 | Movsesian et al. | |
| 2006/0284014 | A1 * | 12/2006 | Muller et al. | 244/119 |
| 2007/0003733 | A1 * | 1/2007 | Muller | 428/73 |
| 2007/0018042 | A1 * | 1/2007 | Muller et al. | 244/117 R |
| 2009/0056257 | A1 * | 3/2009 | Mollinger et al. | 52/314 |
| 2009/0062413 | A1 * | 3/2009 | Adur et al. | 521/157 |
| 2009/0090812 | A1 * | 4/2009 | Boock et al. | 244/1 N |

\* cited by examiner

*Primary Examiner* — David Sample
(74) *Attorney, Agent, or Firm* — Perkins Coie LLP

(57) ABSTRACT

Insulation assemblies and associated methods of use and manufacture are disclosed herein. In one embodiment, for example, an insulation assembly includes a plurality of insulation panels that are configured to releasably attach to an interior surface of an engine housing. The individual insulation panels can include a first surface configured to face the interior surface, and a second surface opposite the first surface and configured to face an engine in the housing. The insulation panels can each further include an attachment portion on the first surface carrying one or more first fasteners that releasably attach to a corresponding portion of the interior surface. The insulation panels can additionally include an attachment strap carried on the second surface. The attachment strap carries a second fastener that releasably attaches to a corresponding portion of the interior surface.

20 Claims, 12 Drawing Sheets

INSULATION ASSEMBLIES FOR ENGINE HOUSINGS AND ASSOCIATED METHODS OF USE AND MANUFACTURE

CROSS-REFERENCE TO RELATED APPLICATION

This application claims priority to U.S. Provisional Patent Application No. 61/392,136, filed Oct. 12, 2010, entitled "INSULATION ASSEMBLIES FOR ENGINE HOUSINGS AND ASSOCIATED METHODS OF USE AND MANUFACTURE," which is incorporated herein by reference in its entirety.

TECHNICAL FIELD

The present disclosure relates generally to insulation assemblies and, more particularly, to removable insulation assemblies for aircraft engine housings.

BACKGROUND

Insulation materials are frequently used to reduce the transmission of heat and sound. In aircraft, for instance, insulation is typically used to protect occupants, cargo, equipment, or other components from extreme or otherwise adverse temperature and sound conditions. For example, aircraft engines can generate a substantial amount of heat and noise during operation. Moreover, aircraft frequently operate in very cold environments since the outside temperature decreases as altitude increases. It may also be desirable to insulate heat sources on military aircraft to reduce or eliminate heat signatures that could result in unwanted detection.

DETAILED DESCRIPTION

The following disclosure describes various embodiments of insulation assemblies, such as removable insulation panels for use with aircraft and the like, and associated methods of manufacture and use. In one embodiment, an insulation assembly configured in accordance with an embodiment of the present disclosure is configured to at least partially insulate or otherwise thermally mask a heat signature of an aircraft engine, such as a helicopter engine. The insulation assembly can include one or more interconnected insulation panels that are configured to be removably and securely attached to an engine housing, engine access door, or similar structure proximate to the engine. For example, the individual insulation panels can be removably secured in place by hook and loop fasteners in addition to releasable mechanical fasteners. The shape of each insulation panel can also be tailored to secure the corresponding panel in place in addition to maximizing the insulative coverage of the panel. The insulation assemblies according to the present disclosure provide improved insulating characteristics in addition to allowing technicians to easily remove or replace the panels without removing the engine and/or without otherwise damaging the engine housing.

Certain details are set forth in the following description and in FIGS. 1A-5B to provide a thorough understanding of various embodiments of the disclosure. Other details describing well-known structures and systems often associated with insulation assemblies and methods for forming such assemblies, as well as other aircraft components and assemblies, are not set forth in the following disclosure to avoid unnecessarily obscuring the description of the various embodiments of the disclosure.

Many of the details, dimensions, angles and/or other portions shown in the Figures are merely illustrative of particular embodiments of the disclosure. Accordingly, other embodiments can have other details, dimensions, angles and/or portions without departing from the spirit or scope of the present disclosure. In addition, further embodiments of the disclosure may be practiced without several of the details described below, while still other embodiments of the disclosure may be practiced with additional details and/or portions.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1A.

Figure 1A:
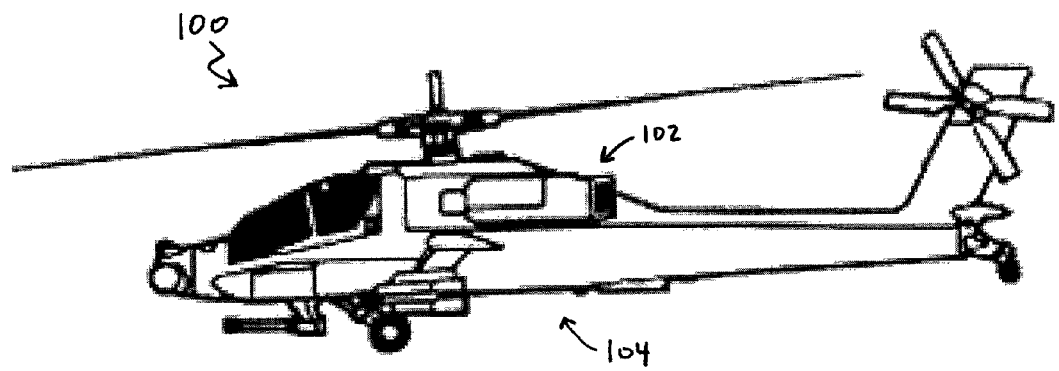
FIG. 1A is a side view of an aircraft utilizing an insulation assembly configured in accordance with an embodiment of the disclosure.

FIG. 1A is a side view of an aircraft 100 that utilizes an insulation assembly configured in accordance with an embodiment of the disclosure. In the illustrated embodiment, the aircraft 100 is a twin engine helicopter, such as an Apache helicopter, that includes an engine assembly 102 carried on each side of a fuselage 104. As described below, the insulation assemblies of the present disclosure are configured to insulate the corresponding engine assemblies 102 to at least partially mask a heat signature or other thermal properties of the corresponding engine assembly 102. Although the aircraft 100 illustrated in FIG. 1A is a helicopter, one of ordinary skill in the art will appreciate that the insulation assemblies disclosed herein can be used with other types of vehicles including, for example, other types of rotorcraft, airplanes, automobiles, military vehicles, watercraft, racing vehicles, etc.

Figure 1B:
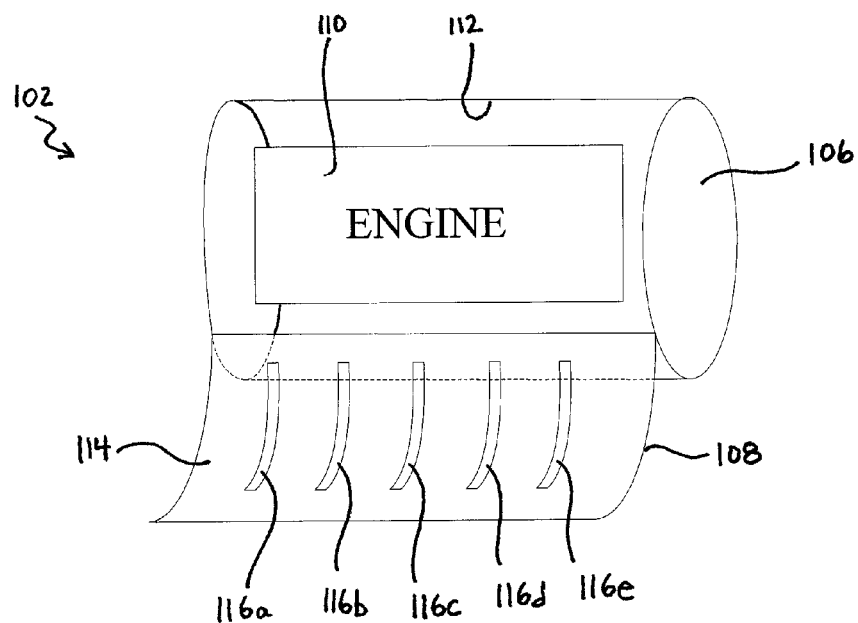
FIG. 1B is a schematic isometric view of an engine housing that receives an insulation assembly configured in accordance with an embodiment of the disclosure.

FIG. 1B is a schematic isometric view of one of the engine assemblies 102 of FIG. 1A. In the embodiment illustrated in FIG. 1B, the engine assembly 102 includes a nacelle or engine housing 106 and a corresponding access door 108. The access door 108 is hingedly attached to the housing 106 and movable between open and closed positions to provide access to an engine 110 (shown schematically). For example, when the access door 108 is in the open position as shown in FIG. 1B, a technician can access the engine 110 within the housing 106 for maintenance or repairs. The access door 108 and/or the engine housing 106 can be manufactured from, e.g., aluminum (e.g., aluminum sheet, castings, machined parts, etc.) composites(e.g., graphite, epoxy, etc.), titanium, and/or any other suitable materials and methods known in the art.

As also shown in FIG. 1B, the housing 106 includes an interior housing surface 112 adjacent to the engine 110. Moreover, the access door 108 includes an interior door surface 114 that is positioned adjacent to the engine 110 when the access door 100 is in the closed position. The access door 108 further includes several stiffeners or support ribs 116 (identified individually as first through fifth support ribs 116a-116e, respectively). Other support ribs or support structures can be positioned along the interior housing surface 112.

The schematic representation of the engine assembly 102 shown in FIG. 1B is intended to illustrate the environment in which an insulation assembly of the present disclosure can be used. For example, and as described in detail below, insulation assemblies of the present disclosure are configured to be coupled to the interior housing surface 112 and/or the interior door surface 114 to generally surround and thermally insulate the engine 110. Moreover, these insulation assemblies are configured to securely attach to these interior surfaces while still providing for easy installation and removal from the housing 106 and the access door 108 without removing the engine 110 from the housing 106. One of ordinary skill in the art will appreciate that the schematic representation of the engine assembly 102 of FIG. 1B does not illustrate several components or features of the engine 110 or the housing 106 to avoid unnecessarily obscuring the description of various features of components described herein.

Figure 2A:
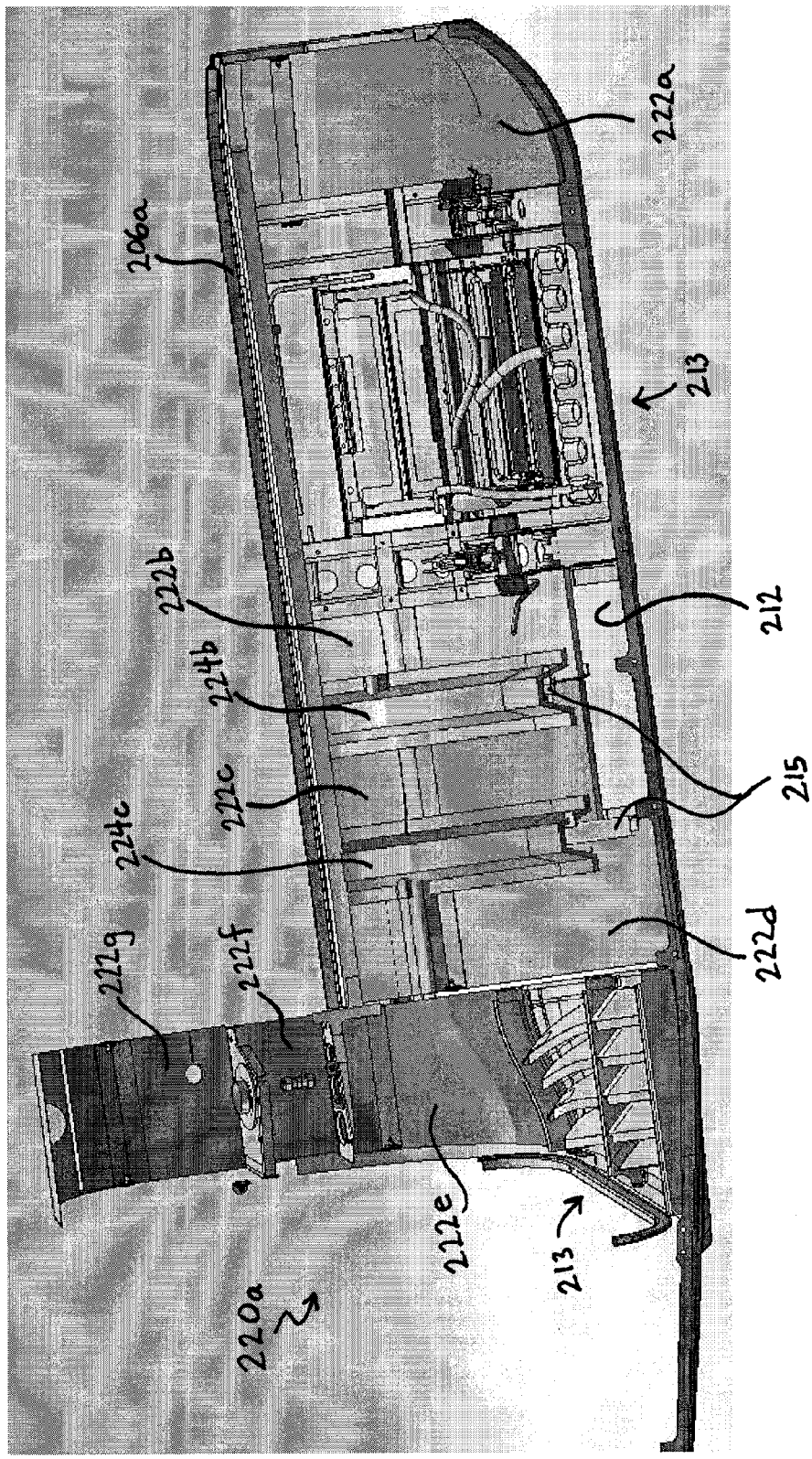
FIG. 2A is a side view of an insulation assembly configured in accordance with an embodiment of the disclosure and positioned in a portion of an engine housing.

FIG. 2A is a side view of an insulation assembly 220a configured in accordance with an embodiment of the disclosure and positioned in a portion of an engine housing 206a. More specifically, the engine housing 206a can be a left side engine housing or nacelle of an aircraft, such as the Apache helicopter shown in FIG. 1A. In the embodiment illustrated in FIG. 2A, the engine has been removed from the engine housing 206a to better illustrate the arrangement of the insulation assembly 220a on an interior surface 212 of the engine housing 206a. More specifically, the insulation assembly 220a is positioned on the interior surface 212 of the engine housing 206a at a location that is adjacent to the fuselage of the corresponding aircraft. As such, the insulation assembly 220a is configured to be positioned at least partially around the engine. As shown in the illustrated embodiment, the insulation assembly 220a includes multiple insulation panels 222 (identified individually as first through seventh insulation panels 222a-222g, respectively) that are individually coupled to the interior surface 212. As explained in detail below, several of the insulation panels 222 are also coupled to each other.

In the illustrated embodiment, the interior surface 212 includes several portions that cannot be covered with insulation panels 222 or are otherwise inaccessible to the insulation panels 222. For example, the interior surface 212 includes one or more uncovered portions 213 having components such as tubing, wiring, supports, etc. that cannot be covered or that otherwise prevent insulation from being positioned at these locations. The insulation assembly 220a nevertheless is configured, to the extent possible, to cover a majority of the interior surface 212. For example, and as explained in detail below, the shape of the individual insulation panels 222 can be tailored to cover the maximum amount of the interior surface 212 at the respective location on the interior surface 212. Moreover, in some instances the individual insulation panels 222 are further configured to cover one or more components of the engine housing 206a projecting inwardly from the interior surface 212. For example, in the illustrated embodiment, the engine housing 206a includes one or more stiffeners or support ribs 215 extending circumferentially along a portion of the interior surface 212. The insulation panels 222 can accordingly be configured to extend over the corresponding support ribs 215. For instance, the second insulation panel 222b can include an extension portion 224b that extends from the second insulation panel 222b over the support rib 215 to attach to the adjacent third insulation panel 222c. In the illustrated embodiment, the third insulation panel 222c also includes a corresponding extension portion 224c that extends from the third insulation panel 222c over the support rib 215 to attach to the fourth insulation panel 222d. Further details regarding several features of the insulation assembly 220a and the corresponding insulation panels 222 are described in detail below.

Figure 2B:
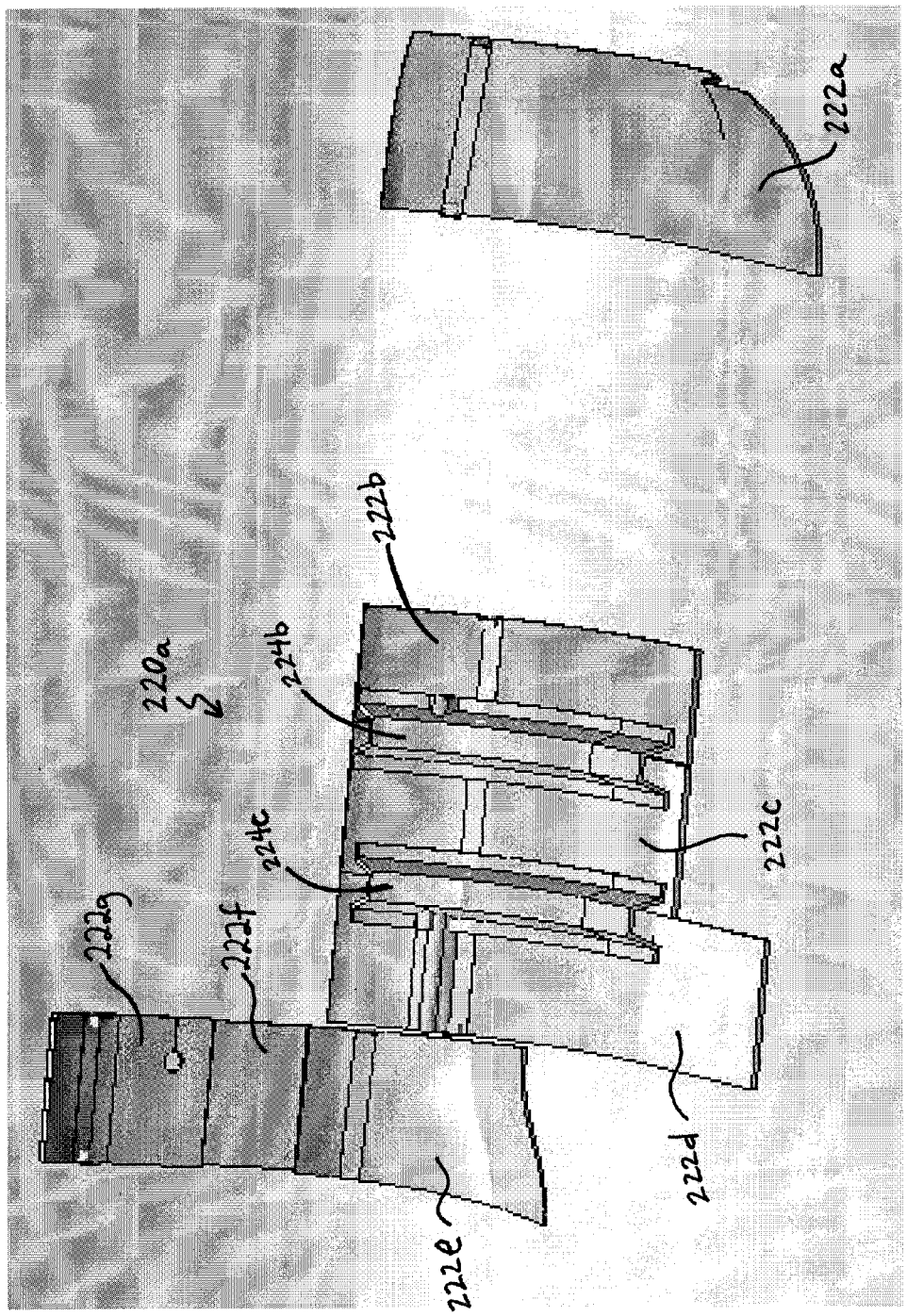
FIG. 2B is a side view of the insulation assembly of FIG. 2A without the engine housing shown in FIG. 2A.

FIG. 2B is a side view of the insulation assembly 220a of FIG. 2A without the engine housing 206a shown in FIG. 2A. As such, the embodiment shown in FIG. 2B illustrates the relative positions of the individual insulation panels 222 with reference to one another.

Figure 2C:
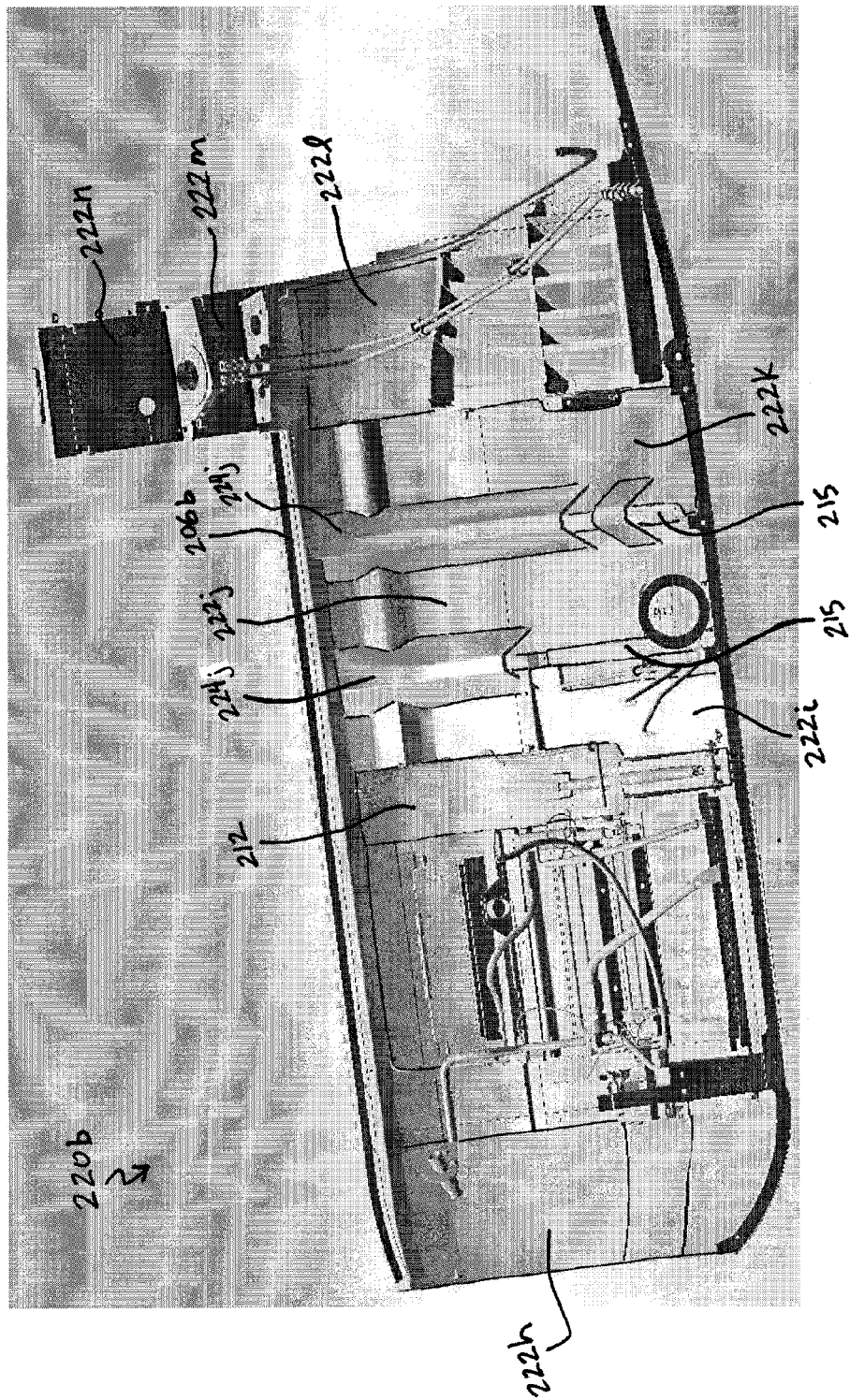
FIG. 2C is a side view of an insulation assembly configured in accordance with another embodiment of the disclosure and positioned in a portion of an engine housing.

FIG. 2C is a side view of an insulation assembly 220b configured in accordance with another embodiment of the disclosure and positioned in a portion of an engine housing 206b. More specifically, the engine housing 206b illustrated in FIG. 2C can be a right side engine housing or nacelle of an aircraft, such as the Apache helicopter shown in FIG. 1A. In the embodiment illustrated in FIG. 2C, the engine has been removed from the engine housing to better illustrate the arrangement of the insulation assembly 220b. Similar to the embodiment described above will reference to FIG. 2A, in the embodiment illustrated in FIG. 2C the insulation assembly 220b includes several individual insulation panels 222 (identified individually as eighth through fourteenth insulation panels 222h-222n, respectively). Individual insulation panels 222 are removably coupled to the interior surface 212. Moreover, several of the insulation panels 222 are coupled to an adjacent insulation panel 222 to at least partially insulate one or more support ribs 215. For example, the tenth insulation panel 222j includes an extension portion 224j that extends over the corresponding support rib 215 and is attached to the adjacent ninth insulation panel 222k.

Figure 2D:
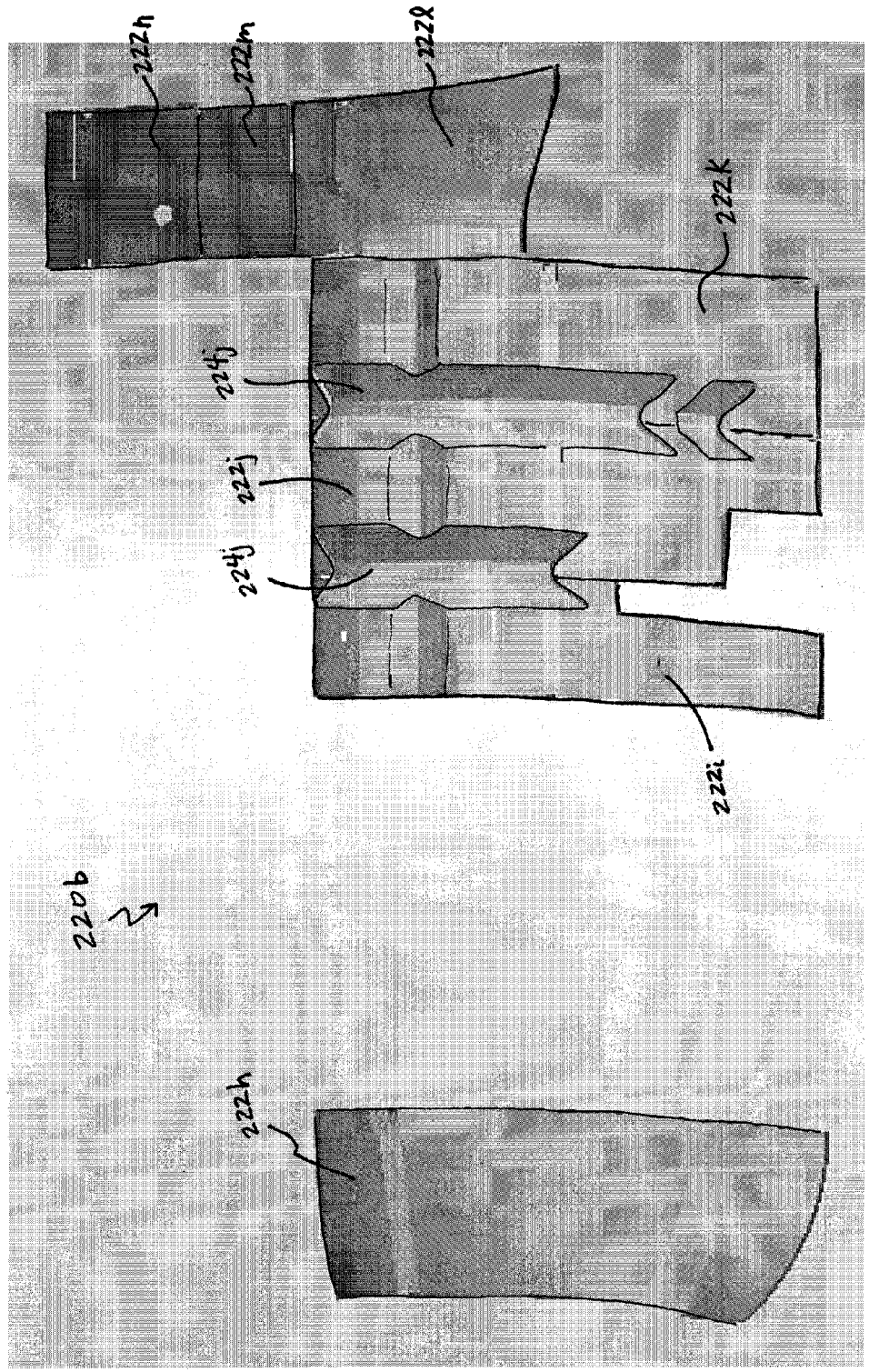
FIG. 2D is a side view of the insulation assembly of FIG. 2C without the engine housing shown in FIG. 2C.

FIG. 2D is a side view of the insulation assembly 220b of FIG. 2C without the engine housing 206b shown in FIG. 2C. As such, the embodiment shown in FIG. 2D illustrates the relative positions of the individual insulation panels 222 with reference to on another.

Figure 3A:
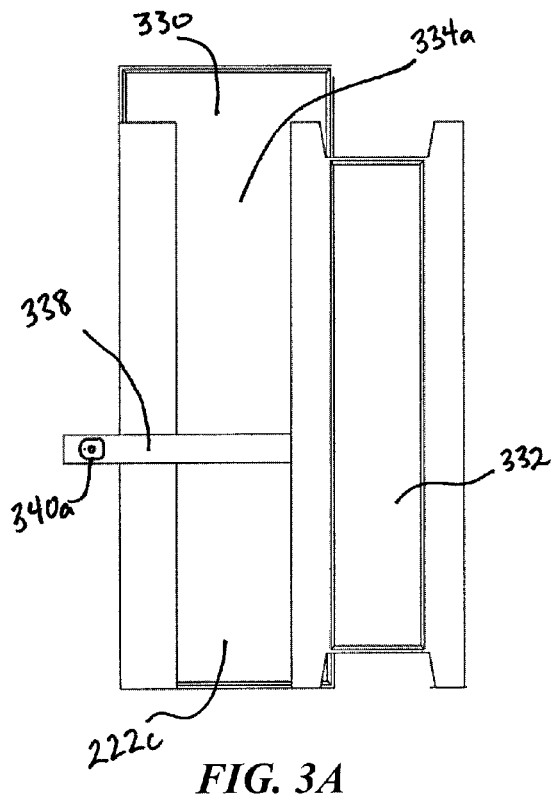
FIG. 3A is a front side view and FIG. 3B is a backside view of an insulation panel configured in accordance with an embodiment of the disclosure.
Figure 3B:
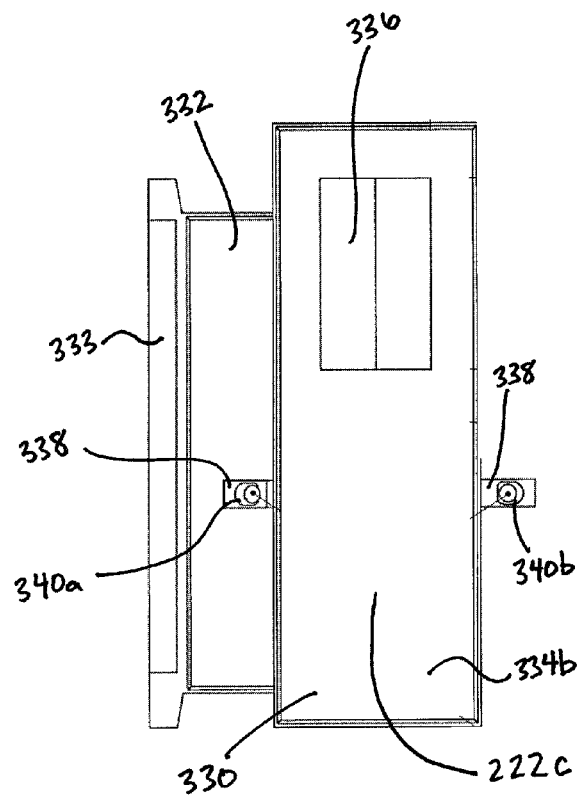

FIG. 3A is a front side view of the third insulation panel 222c of FIGS. 2A and 2B, and FIG. 3B is a backside view of the third insulation panel 222c. Several features of the third insulation panel 222c described in detail below with reference to FIGS. 3A and 3B are representative of features that can be included in any of the other insulation panels 222 described above. For example, referring to FIGS. 3A and 3B together, the third insulation panel 222c includes an extension portion 332 extending from a body 330. The body 330 has a first side 334a (FIG. 3A) opposite a second side 334b (FIG. 3B). The first side 334a is configured to face the engine, and the second side 334b is configured to be removably attached to the interior surface of the corresponding engine housing. In certain embodiments, the body 330 can include an insulation material that is covered with a flame retardant material, such as a glass fiber cloth that is coated with a flame retardant modified acrylic copolymer. For example, in one embodiment the flame retardant material can be made from KlevoGlass 320-3 RL Ga 2 weiß available from Klevers GmbH & Co. KG. In other embodiments, however, the body 330 can include other insulative materials, flame retardant materials, and/or other suitable covering materials.

According to another feature of the illustrated embodiment, the body 330 includes an attachment region or portion 336 on the second side 334b that is configured to releasably engage a corresponding attachment region or portion of the interior surface of the engine housing. In certain embodiments, for example, the attachment portion 336 can be a releasable and flexible fastener, such as a hook and loop fastener, that removably engages a corresponding hook and loop fastener that is secured to the interior surface of the engine housing. More specifically, the attachment portion 336 can be a woven hook or loop tape that is sewn, adhered, riveted, stapled, or otherwise suitably attached to the body 330. The attachment portion 336 is positioned on the body 330 at a location that is aligned with the corresponding location of the attachment portion on the interior surface of the engine housing. In certain embodiments, the attachment portion 336 can be an APLIX 840 Hook and Loop fastener available from APLIX, Inc.

The extension portion 332 can also include an extension attachment region or portion 333 (FIG. 3B) extending along a peripheral edge portion thereof. The extension attachment portion 333, however, is not configured to directly releasably engage the interior surface of the engine housing. Rather, the extension attachment portion 333 is configured to releasably engage an adjacent insulation panel. More specifically, the extension attachment portion 333 can removably engage a corresponding attachment portion on the front side of an adjacent insulation panel. In certain embodiments, for example, the extension attachment portion 333 can be a hook and loop fastener similar to the attachment portion 336 described above. In other embodiments, however, the extension attachment portion 333 can include fasteners suitable for releasably engaging an adjacent insulation panel. Moreover, although the extension portion 332 includes a generally rectangular or rectilinear shape in the illustrated embodiment, in other embodiments the extension portion 332 can have other shapes including, for example, curved, circular, irregular, and/or other types of suitable shapes.

According to another feature of the illustrated embodiment, the third insulation panel 222c further includes an attachment support or strap 338 that is also configured to removably attach the body 330 to the corresponding interior surface of the engine housing. More specifically, the attachment strap 338 is sewn or otherwise attached to the body 330. The attachment strap carries fasteners 340 (identified individually as a first fastener 340a and a second fastener 340b), such as mechanical fasteners, that are configured to releasably engage corresponding fasteners carried by the interior surface of the engine housing. In certain embodiments, for example, the fasteners 340 carried by the attachment strap 338 can be Lift-the-Dot® fasteners that release when pulled in one direction, but that remained engaged when pulled in any other direction. In another embodiment, the fasteners 340 can be Military Standard MS27977 fasteners. In still further embodiments, the fasteners 340 can be other suitable fasteners for releasable attachment. Further details regarding the fasteners 340 are described below with reference to FIGS. 4A and 4B.

Figure 3C:
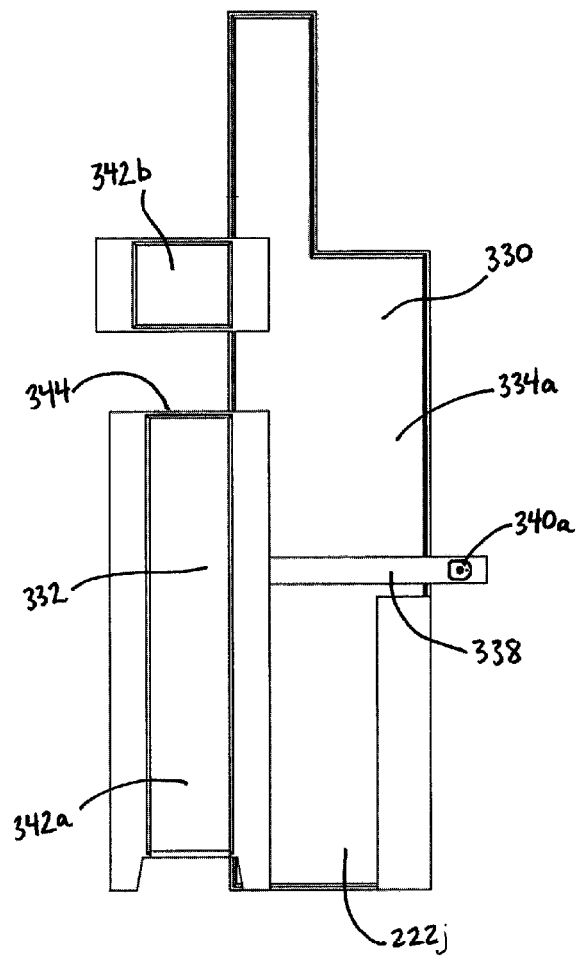
FIG. 3C is a front side view and FIG. 3D is a backside view of an insulation panel configured in accordance with another embodiment of the disclosure.
Figure 3D:
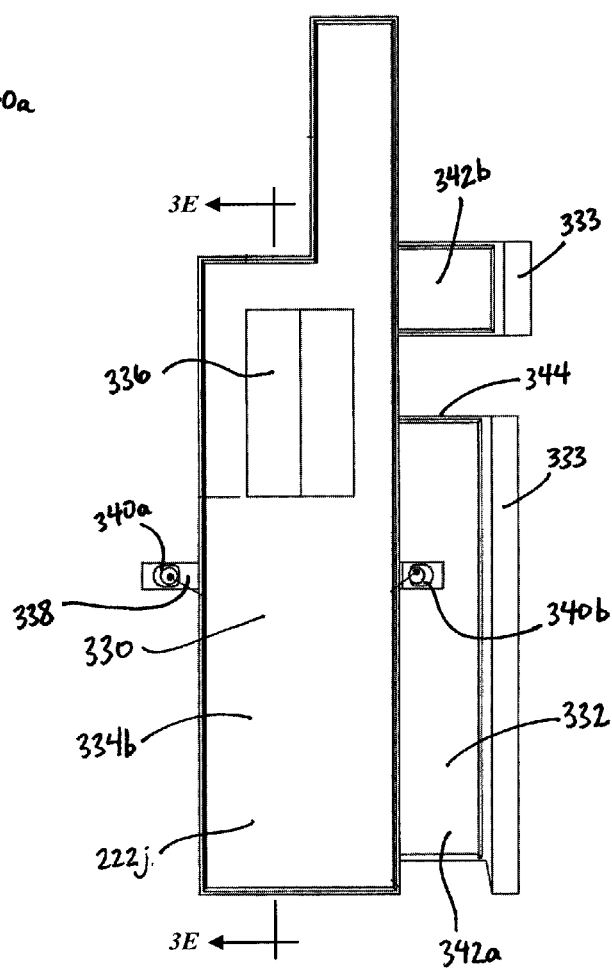

FIG. 3C is a front side view of the tenth insulation panel 222j of FIGS. 2C and 2D, and FIG. 3D is a backside view of the tenth insulation panel 222j. Several features of the tenth insulation panel 222j are described in detail below with reference to FIGS. 3C and 3D, as representative features that can be included in any of the other insulation panels 222 described above. Moreover, several features of the tenth insulation panel 222j are generally similar in structure and function to the corresponding features of the third insulation panel 222c described above. For example, and referring to FIGS. 3C and 3D together, the tenth insulation panel 222j includes an extension portion 332 extending laterally away from a body 330. The body 330 includes a first side 334a (FIG. 3C) opposite a second side 334b (FIG. 3D). The first side 334a is configured to be positioned adjacent to the engine, and the second side 334b is configured to be removably attached to the interior surface of the corresponding engine housing. The body 330 also includes an attachment region or portion 336 (such as a hook and loop fastener) on the second side 334b that is configured to releasably engage a corresponding attachment region or portion of the interior surface of the engine housing. The tenth insulation panel 222j further includes an attachment support or strap 338 that carries fasteners 340 (identified individually as a first fastener 340a and a second fastener 340b), such as Lift-the-Dot® fasteners, Military Standard MS27977 fasteners, or other suitable fasteners to removably attach the body 330 to the corresponding interior surface of the engine housing.

In the illustrated embodiment, however, the extension portion 332 includes a cut-out portion 344 separating a first extension segment 342a from a second extension segment 342b. The cut-out portion 344 is designed to accommodate structure or obstructions in the engine housing (e.g., tubes, supports, stiffeners, etc.) that the extension portion 332 cannot cover. Although each of the cut-out portion 344 and the extension segments 342 has a generally rectangular or rectilinear shape in the illustrated embodiment, in other embodiments these features can have other shapes suitable for accommodating or otherwise insulating around structural components (e.g., support ribs, hoses, etc.) within the engine housing. Moreover, each extension segment 342 can also include an extension attachment region or portion 333 (FIG. 3D) at a peripheral edge portion thereof that is configured to releasably engage an adjacent insulation panel. In certain embodiments, the extension attachment portion 333 can be a hook and loop fastener similar to the other attachment portions described above.

Figure 3E:
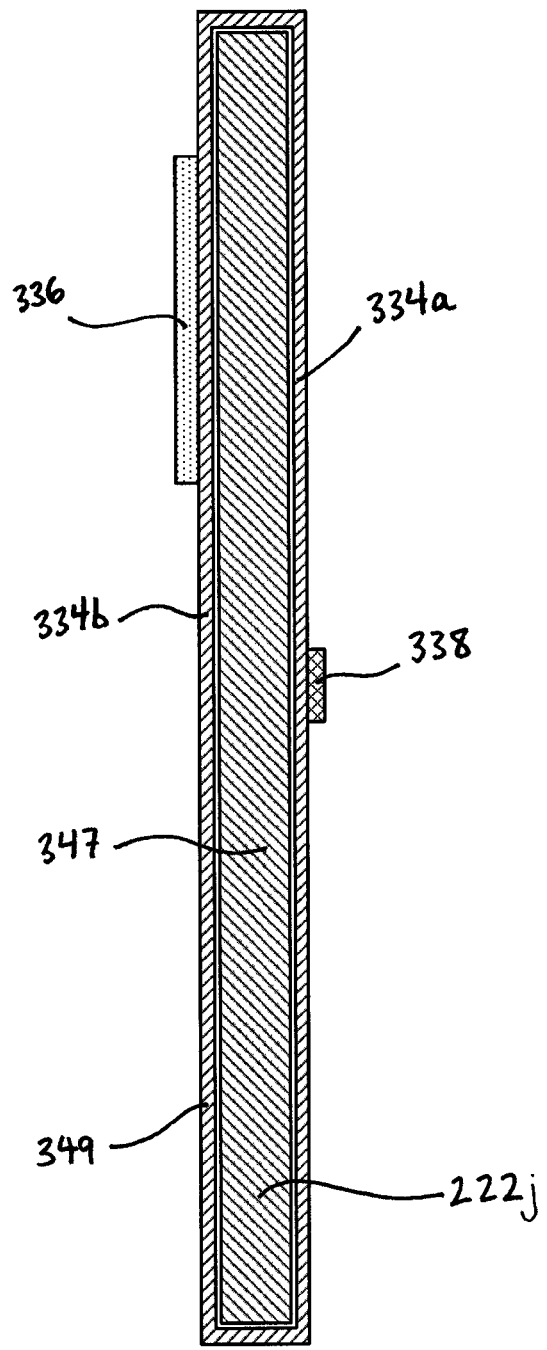
FIG. 3E is a side cross-sectional view of the insulation panel of FIG. 3D taken substantially along lines 3E-3E in FIG. 3D.

FIG. 3E is a side cross-sectional view of the tenth insulation panel 222j taken substantially along lines 3E-3E in FIG. 3D. As shown in FIG. 3E, the tenth insulation panel 222j includes the attachment strap 338 coupled to the first side 334a and the attachment portion 336 coupled to the second side 334b. As also shown in FIG. 3E, the tenth panel 222j can also include an insulation material 347 positioned inside a cover 349. As noted above, the insulation material 347 and the cover 349 can be made from any suitable insulating materials, as are commonly known to those of ordinary skill in the art. In certain embodiments, for example, the cover 349 can be made from a glass fiber cloth that is coated with a flame retardant modified acrylic copolymer, as is available from Klevers GmbH & Co. KG. Moreover, the insulation material 347 can also be at least partially made from any suitable flame retardant material.

Figure 4A:
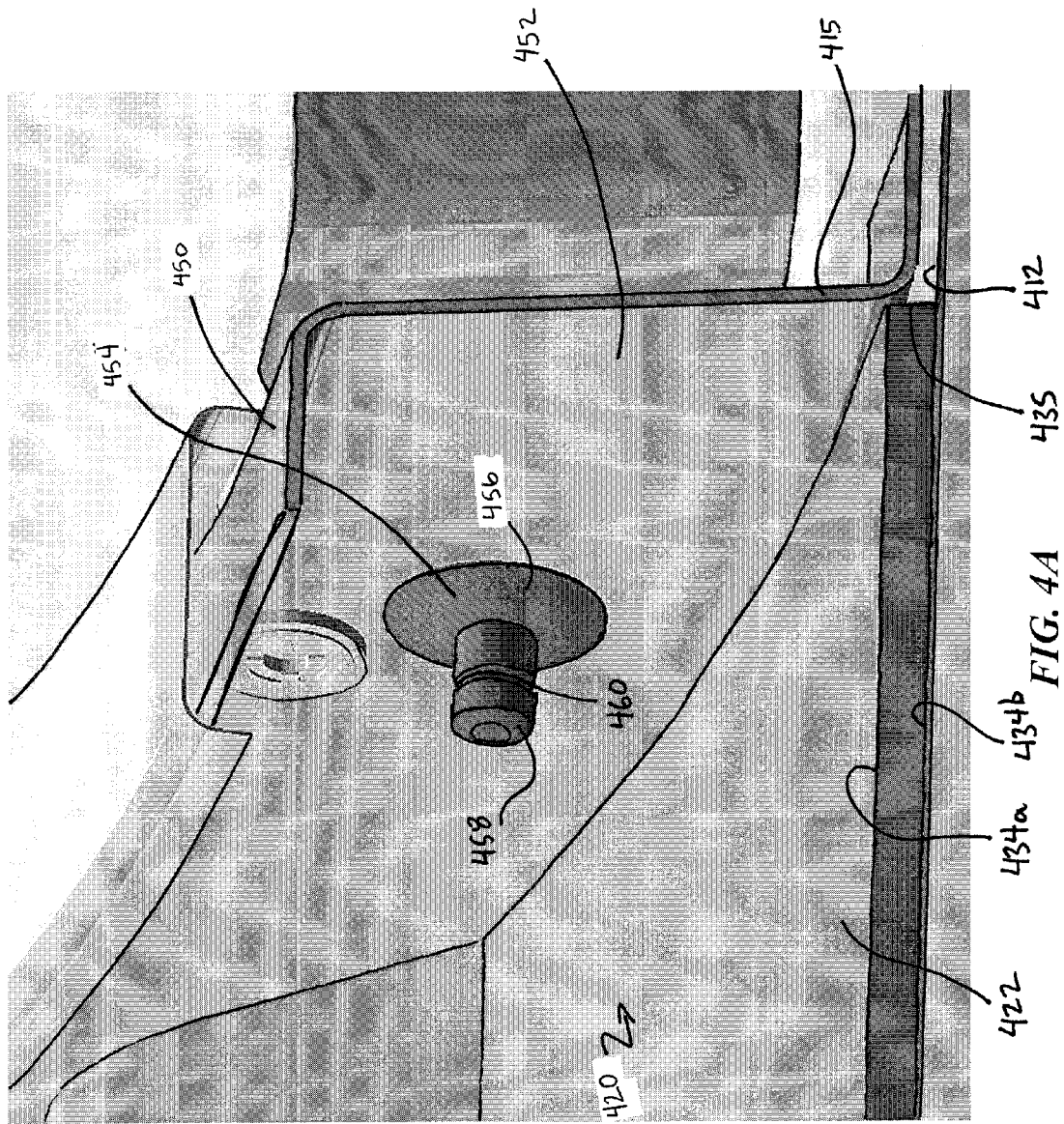
FIGS. 4A and 4B are isometric cross-sectional views of a portion of an insulation assembly configured in accordance with another embodiment of the disclosure.
Figure 4B:
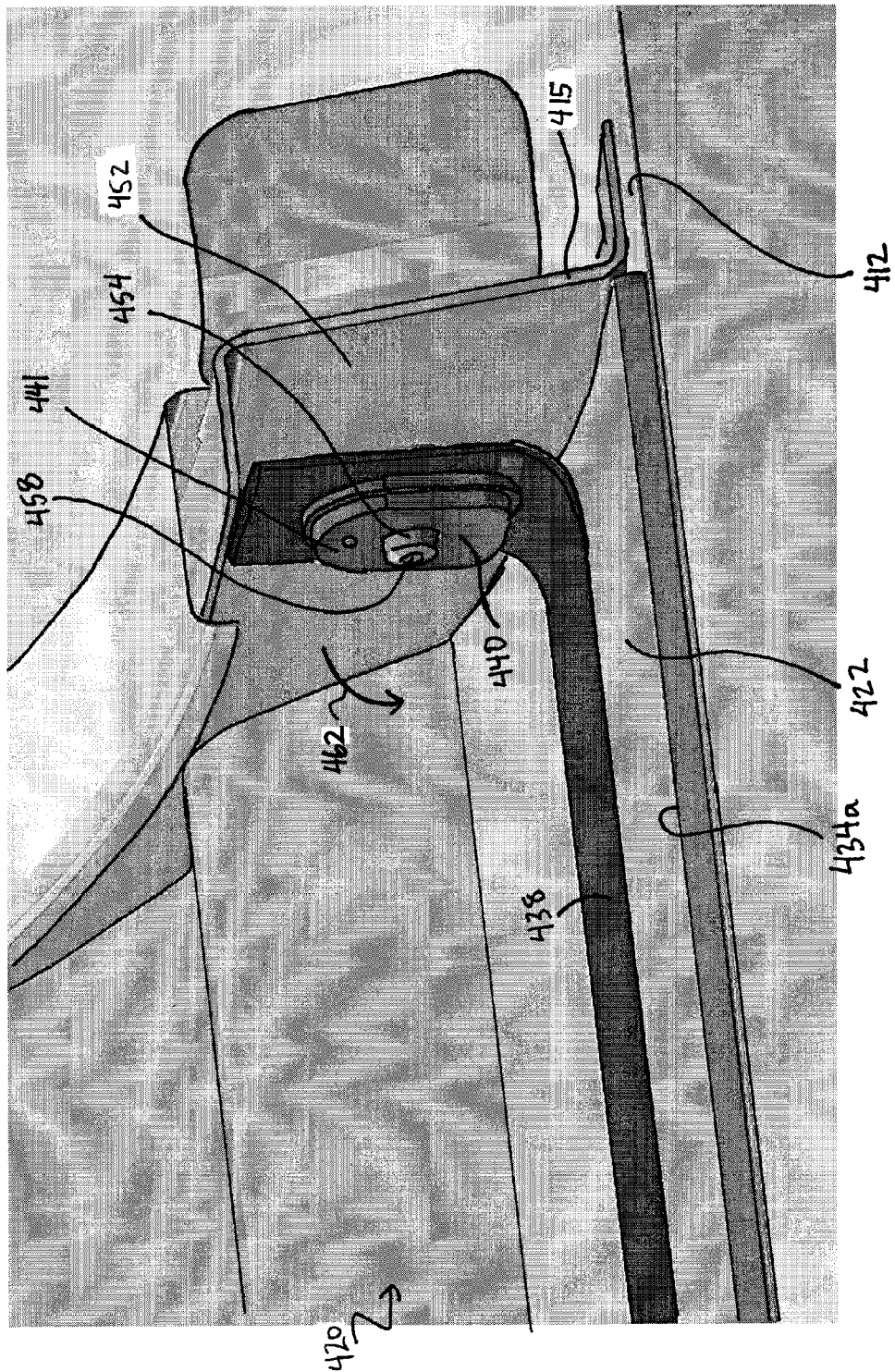

FIGS. 4A and 4B are isometric cross-sectional views of a portion of an insulation assembly 420 configured in accordance with an embodiment of the disclosure. The insulation assembly 420 can include several features that are generally similar in structure and function to the corresponding features of the insulation assemblies 220 described above with reference to FIGS. 1A-3E. The embodiment shown in FIGS. 4A and 4B illustrates several configurations for securing the insulation assembly 420 to an interior housing surface 412. Referring to FIG. 4A, for example, the insulation assembly 420 includes an insulation panel 422 attached to the interior housing surface 412 adjacent to a stiffener or support rib 415. More specifically, the insulation panel 422 includes a first or frontside surface 434a opposite a second or backside surface 434b. The frontside surface 434a is configured to face or otherwise be positioned adjacent to an engine (not shown). The backside surface 434b is removably attached to the interior housing surface 412 with an attachment region or portion, such as a hook and loop fastener, as described in detail above. Moreover, the insulation panel 422 also includes a lateral edge portion 435 adjacent to the support rib 415. The support rib 415 includes an overhang or lip 450 extending from a lateral surface thereof. The insulation panel 422 is shaped or otherwise configured to position the lateral edge portion 435 adjacent to the support rib 415 and to fit beneath the support rib overhang 450. The overhang 450 can accordingly generally retain the insulation panel 422 in position should the backside surface 434b become detached from the interior housing surface 412.

According to another feature of the illustrated embodiment, the insulation assembly 420 includes a first mechanical fastener or stud 454 attached to a lateral rib face 452 of the support rib 415. More specifically, the stud 454 includes a base portion 456 that is fixedly attached to the lateral rib face 452. In certain embodiments, for example, the base portion 456 can be adhered to the lateral rib face 452 with an adhesive, such as CB394 Epoxy available from Click Bond, Inc. In other embodiments, however, the base portion 456 can be attached to the lateral face 452 with other suitable attachment mechanisms including, for example, bolting, welding, riveting, etc. The stud 454 also includes a shaft or stud portion 458 extending from the base portion 456. A groove or channel 460 extends circumferentially around the stud portion 458. As described in detail below with reference to FIG. 4B, the channel 460 is configured to releasably engage a corresponding fastener to further secure the insulation panel 422 in place.

Turning next to FIG. 4B, the insulation assembly 420 includes an Attachment support or strap 438 that is secured (e.g., sewn) to the frontside surface 434a of the insulation panel 422. The attachment strap 438 carries a second fastener or socket 440 that is configured to removably engage the stud portion 458 of the first fastener 454. The attachment strap 438 and associated fastener 440 can be generally similar to the corresponding attachment straps 338 and fasteners 340 described above with reference to FIGS. 3A-3D. For example, the second fastener 440 can be a one way fastener that can be removed from the first fastener 454 only when a user pulls the second fastener 440 in a specified direction. More specifically, in the illustrated embodiment, the second fastener 440 can only be removed from the first fastener 454 by pulling a distal end portion 441 of the second fastener 440 towards the frontside surface 434a of the insulation panel 422 in the direction indicated by arrow 462. In other embodiments, the second fastener 440 can release from the first fastener 454 in a different direction. Moreover, in still further embodiments, the attachment strap 438 can be removably secured to the lateral rib face 452 of the support rib 415 with other suitable removably fasteners.

As described in detail above, the insulation assemblies disclosed herein can be removably secured to the corresponding engine housings by various different mechanisms or methods. For example, and with reference to the embodiment shown in FIGS. 4A and 4B, the backside 434b of the insulation panel 422 can be removably secured to the interior housing surface 412 by one or more attachment regions including corresponding hook and loop fasteners. The attachment strap 438 also secures the insulation panel 422 to the support rib 415 via the fastener 440. Moreover, the insulation panel 422 is shaped or otherwise configured to fit beneath the support rib overhang 450 such that the overhang 450 can generally retain the insulation panel 422 in position should the backside surface 434b become detached from the interior housing surface 412 and/or the fastener 440 disengages the stud portion 458.

Figure 5A:
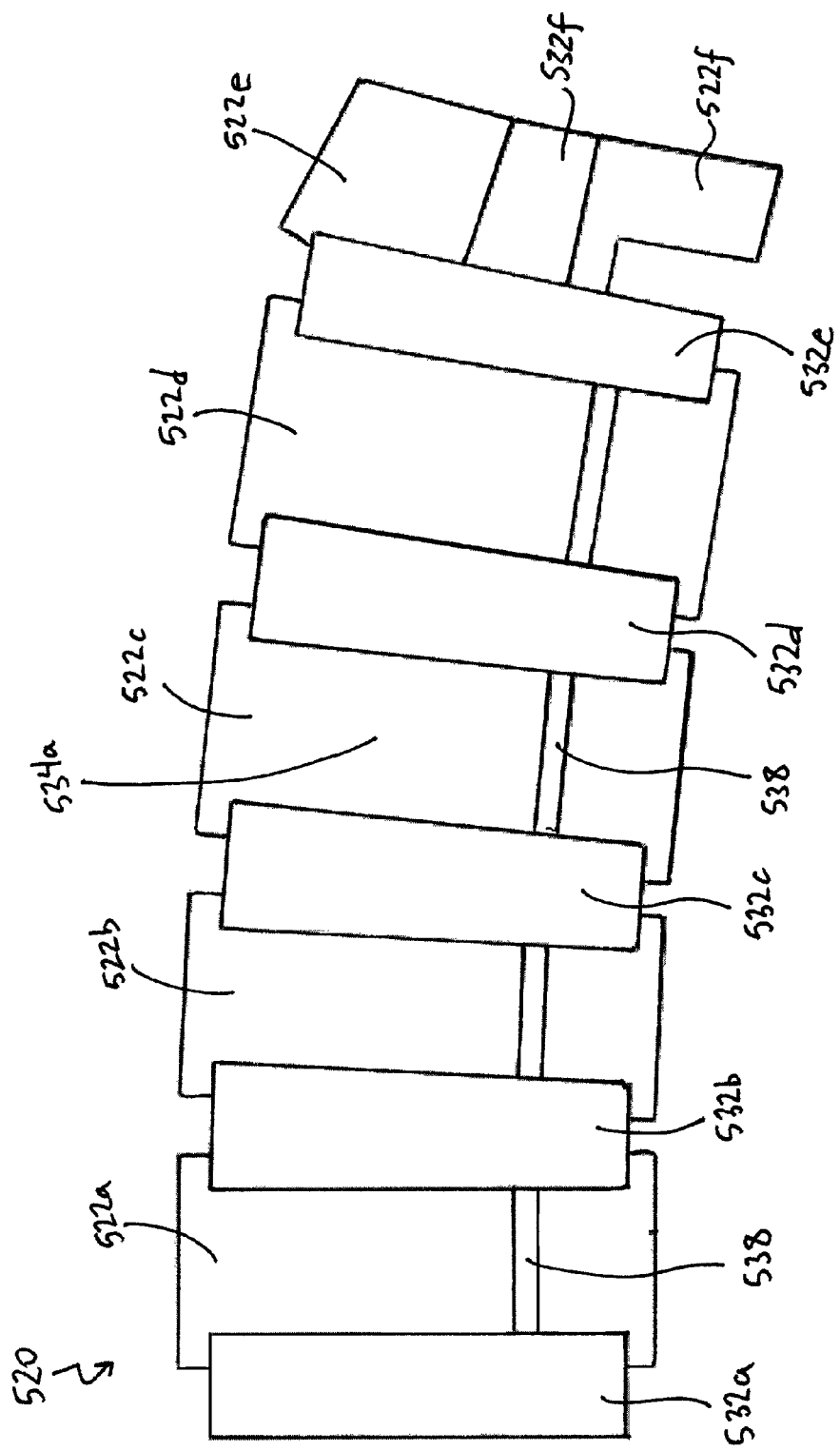
FIG. 5A is a front view and FIG. 5B is a back view of an access door insulation panel assembly configured in accordance with yet another embodiment of the disclosure.
Figure 5B:
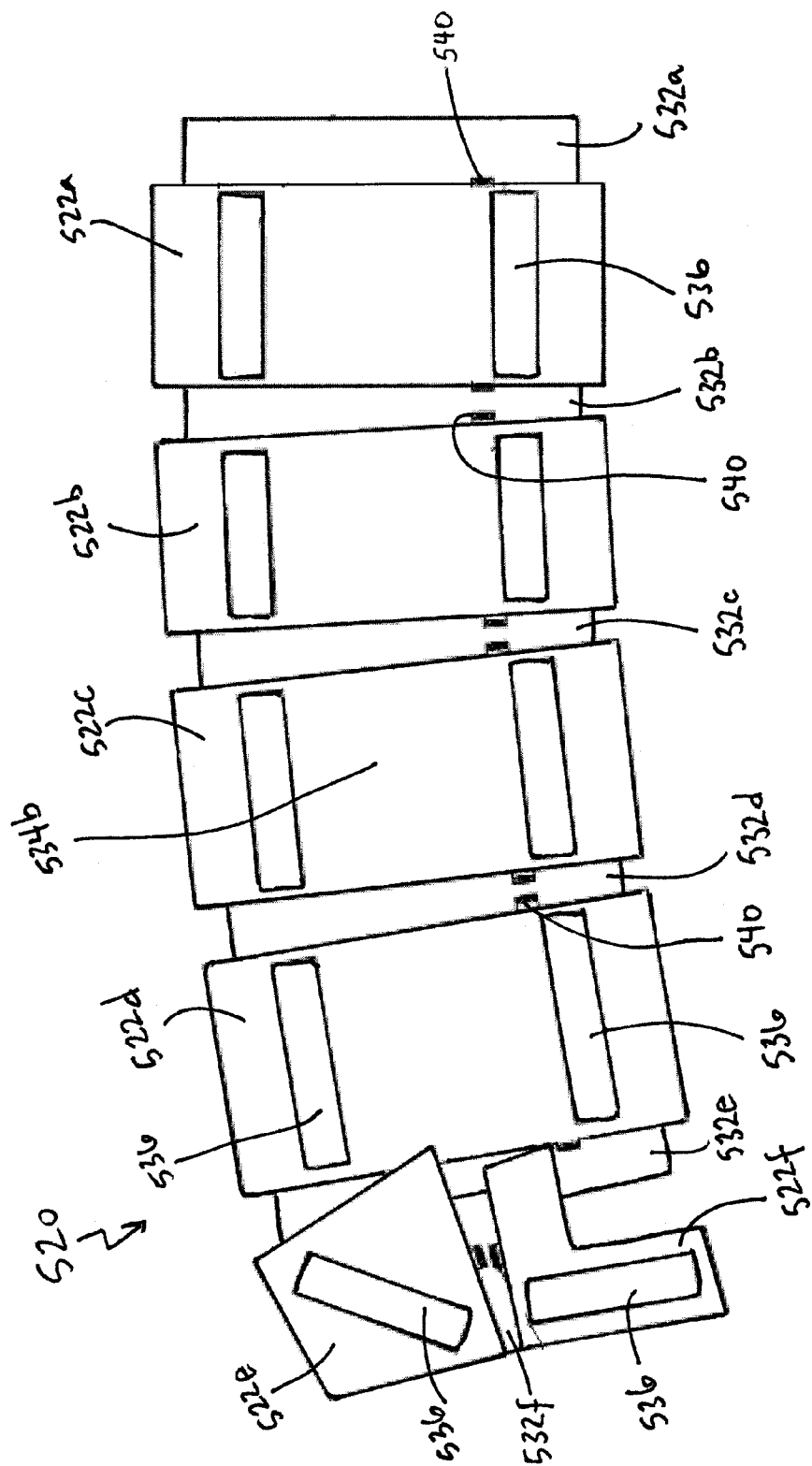

FIG. 5A is a front view and FIG. 5B is a back view of an access door insulation panel assembly 520 configured in accordance with another embodiment of the disclosure. The insulation assembly 520 can include several features that are generally similar in structure and function to the corresponding features of the insulation assemblies 220, 420 described above with reference to FIGS. 2A-4B. Referring to FIGS. 5A and 5B together for example, the panel assembly 520 is configured to insulate the interior surface of an access door of an engine housing, such as the interior surface 114 of the access door 108 schematically shown in FIG. 1B. The panel assembly 520 illustrated in FIGS. 5A and 5B includes several features that are generally similar in structure and function to the corresponding features of the insulation assemblies and corresponding insulation panels described above with reference to FIGS. 2A-4B. For example, the insulation assembly 520 shown in FIGS. 5A and 5B includes multiple insulation panels 522 (identified individually as first through sixth insulation panels 522a-522f) that are interconnected (e.g., sewn) with corresponding extension portions 532 (identified individually as first through sixth extension portions 532a-532f). The extension portions 532 are configured to provide insulation between the insulation panels 520 to cover corresponding structural features on the access door (e.g., stiffeners or support ribs 116 shown schematically in FIG. 1B). The extension portions 532 also securely connect the corresponding insulation panels 522. For example, the extension portions 532 can be sewn or otherwise non-removably attached to the corresponding adjacent insulation panels 522. As such, the interconnected insulation panels 522 and corresponding extension portions 532 form an insulative blanket or covering that can be tailored to cover or otherwise fully insulate an access door as described in detail below. In other embodiments, however, the individual extension portions 532 can be removably attached (e.g., with hook and loop fasteners, or other suitable fasteners) to one or more of the corresponding adjacent insulation panels 522 or extension portions 532.

In the illustrated embodiment, the insulation assembly 520 includes a first or frontside 534a opposite a second or backside 534b. The front side 534a is configured to be positioned opposite or otherwise adjacent to an engine. The backside 534b is configured to be releasably attached to the interior surface of the access door. For example, the individual panels include a corresponding attachment support or strap 538. Each attachment strap 538 carries one or more fasteners 540, such as mechanical fasteners, that are configured to releasably engage corresponding fasteners carried by the interior surface or other structures of the engine housing. In certain embodiments, the fasteners 540 can be one way fasteners, such as fasteners 340 and 440 described in detail above with reference to FIGS. 3A-3D and 4B. In other embodiments, however, the fasteners 540 can include other suitable fasteners for releasably engaging the corresponding fasteners on the access door. Moreover, the individual insulation panels 522 also include one or more attachment regions or portions 536 that are also configured to releasably engage a corresponding attachment region or portion on the interior surface of the access door. In certain embodiments, for example, the attachment portion 536 can be a releasable and flexible fastener, such as a hook and loop fastener, that removably engages a corresponding hook and loop fastener that is secured to the interior surface of the engine housing. For instance, the attachment portions 536 can be generally similar to the attachment portions 336 described above with reference to FIGS. 3A-3D.

Although the embodiment illustrated in FIGS. 5A and 5B includes a single attachment strap 538 extending laterally across each corresponding panel 522, in other embodiments the insulation assembly 520 can include two or more attachment straps 538 for each insulation panel 522. Moreover the attachment straps 538 can be oriented in other directions along the corresponding insulation panel 522, including, for example, longitudinally along the corresponding insulation panel 522. In addition, although the illustrated embodiment includes two attachment portions 536 extending laterally across each of the first through fourth insulation panels 522a-522d, in other embodiments the insulation assembly 520 can include more or less attachment portions 536 extending in different directions on the corresponding insulation panels 522. For example, as shown in FIG. 5B, the fifth insulation panel 522e and the sixth insulation panel 522f each includes a corresponding single attachment portion 536 extending in directions different than that of the attachment portions 536 of the first through fourth insulation panels 522a-522d.

Embodiments of the insulation assemblies disclosed herein provide several unique features and advantages. For example, embodiments disclosed herein provide for a secure and complete insulative coverage to at least partially mask the thermal signature of an aircraft engine, which can at least partially prevent others from thermally detecting the aircraft. More specifically, the interconnected insulation panels of the various embodiments disclosed herein securely attach to the corresponding engine housing structure. Moreover, the insulation panels can be removed and/or replaced by a technician without removing the engine from the corresponding engine housing. For example, the technician can position the insulation panels at the desired locations and secure the insulation panels at the desired locations.

From the foregoing, it will be appreciated that specific embodiments of the disclosure have been described herein for purposes of illustration, but that various modifications may be made without deviating from the spirit and scope of the various embodiments of the disclosure. For example, although many of the embodiments described above include insulation panels having generally rectilinear shapes, in other embodiments insulation assemblies configured in accordance with the present disclosure can include insulation panels having any suitable shape to cover or otherwise insulate a portion of an engine assembly. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the disclosure is not limited except as by the appended claims.

I claim:

1. An insulation assembly for surrounding at least a portion of an aircraft engine positioned in an engine housing having an interior surface, the insulation assembly comprising:
   a plurality of insulation panels configured to be positioned adjacent to the engine,
      wherein individual insulation panels comprise—
      a first surface configured to face the engine;
      a second surface opposite the first surface and configured to face the interior surface;
      an attachment portion carried on the second surface, wherein the attachment portion includes a first fastener that releasably attaches to a first portion of the engine housing; and
      an attachment strap coupled to the first surface, wherein the attachment strap carries a second fastener that releasably attaches to a second portion of the engine housing.

2. The assembly of claim 1 wherein the first fastener comprises a first portion of a hook and loop type fastener that releasably attaches to a complementary second portion of a hook and loop type fastener positioned on at the first portion of the engine housing.

3. The assembly of claim 1 wherein a first one of the insulation panels further comprises:
   a body; and
   an extension projecting away from the body and including a third fastener carried on the first surface of the first one of the insulation panels that releasably attaches to a corresponding portion on the first surface of a second one of the insulation panels adjacent to the first one of the insulation panels.

4. The assembly of claim 3 wherein the third fastener comprises first portion of a hook and loop type fastener that releasably attaches to a complementary second portion of a hook and loop type fastener at the corresponding portion of the second one of the insulation panels.

5. The assembly of claim 3 wherein the engine housing includes a component extending away from the interior surface at a location between the first one of the insulation panels and the second one of the insulation panels, and wherein the extension portion is an extension portion of the first one of the insulation panels that is configured to at least partially cover the component and releasably attach to the first surface of the second one of the insulation panels.

6. The assembly of claim 1 wherein the engine housing includes a stud carried by the interior surface, and wherein the second fastener comprises a socket that releasably engages the stud.

7. The assembly of claim 6 wherein the socket releases the stud when the socket is pulled in one direction and remains engaged with the stud when pulled in any other direction.

8. The assembly of claim 6 wherein the engine housing includes a stiffener having a lateral stiffener face projecting away from the interior surface, wherein the stud extends from the lateral stiffener face, and wherein the socket releasably engages the stud to retain the insulation panel adjacent to the stiffener.

9. The assembly of claim 1 wherein individual insulation panels comprise;
   an insulative body; and
   a flame resistant cover at least partially surrounding the insulative body.

10. An assembly for insulating an engine positioned in an engine housing having an interior surface, the assembly comprising:
   first and second panels configured to be removably attached to the interior surface adjacent to the engine, wherein the individual first and second panels each includes a body having a first side facing the engine, a second side facing the interior surface, and a first attachment portion carried by the second side that removably attaches to a corresponding section of the engine housing, wherein—
   the first panel further comprises a second attachment portion carried by the first side; and
   the second panel further comprises an extension portion projecting from the body, the extension portion having a third attachment portion that removably attaches to the second attachment portion of the first panel.

11. The assembly of claim 10 wherein the first, attachment portion includes a first portion of a first hook and loop type fastener, the second attachment portion includes a second portion of a second hook and loop type fastener, and the third attachment portion includes a third portion of the second hook and loop type fastener.

12. The assembly of claim 10 wherein the first and second panels each comprises an attachment strap carried by the first side, wherein the attachment strap carries a fourth attachment portion that removably attaches to a corresponding section of the engine housing.

13. The assembly of claim 12 wherein the fourth attachment portion comprises a socket that removably attaches to a stud projecting from the corresponding section of the engine housing.

14. The assembly of claim 12 wherein the attachment strap is spaced apart from the first attachment portion on each of the first and second panels.

15. The assembly of claim 10 wherein the engine housing includes a structural component projecting inwardly from the interior surface, and wherein the first panel is configured to be positioned on a first side of the structural component and the second panel is configured to be positioned on a second side of the structural component, and wherein the extension portion at least partially covers the structural component.

16. An assembly for insulating an engine positioned in an engine housing, the engine housing having an interior surface, the assembly comprising:
    first and second panels configured to be removably attached to the interior surface adjacent to the engine, wherein the individual first and second panels each includes a body having a first side facing the engine, a second side facing the interior surface, and a first attachment portion carried by the second side that removably attaches to a first portion of the engine housing, wherein—
the first panel further includes a second attachment portion carried by the first side of the first panel; and
the second panel further includes an extension portion projecting from the body of the second panel, the extension portion having a third attachment portion that removably attaches to the second attachment portion of the first panel, and
wherein the first and second panels each include an attachment strap coupled to the first side, wherein each of the attachment straps carries a fourth attachment portion that removably attaches to a second portion of the engine housing.

17. The assembly of claim 16 wherein the attachment strap is spaced apart from the first attachment portion on each of the first and second panels.

18. The assembly of claim 16 wherein the second portion of the engine housing includes a stud carried by the interior surface, and wherein the fourth attachment portion includes a socket that releasably engages the stud.

19. The assembly of claim 18 wherein the socket releases the stud when the socket is pulled in one direction and remains engaged with the stud when pulled in any other direction.

20. The assembly of claim 16 wherein each of the first and second panels include:
    an insulative body; and
    a flame resistant cover at least partially surrounding the insulative body.

\* \* \* \* \*

UNITED STATES PATENT AND TRADEMARK OFFICE
CERTIFICATE OF CORRECTION

PATENT NO. : 9,017,789 B2  
APPLICATION NO. : 13/271760  
DATED : April 28, 2015  
INVENTOR(S) : Wilson Riley Vance, Jr.

Page 1 of 1

It is certified that error appears in the above-identified patent and that said Letters Patent is hereby corrected as shown below:

Specification

In column 5, line 6, delete "weiβ" and insert -- weiß, --, therefor.

In column 7, line 43, delete "Attachment" and insert -- attachment --, therefor.

In column 7, line 53, delete "fastener440" and insert -- fastener 440 --, therefor.

Claims

In column 10, line 8, in claim 2, delete "on at" and insert -- on --, therefor.

In column 11, line 1, in claim 11, delete "the first," and insert -- the first --, therefor.

Signed and Sealed this
Twenty-third Day of February, 2016

Michelle K. Lee
*Director of the United States Patent and Trademark Office*